(12) United States Patent
Yang et al.

(10) Patent No.: US 8,978,527 B2
(45) Date of Patent: Mar. 17, 2015

(54) LONG SHAFT BIT HAVING VIBRATION PREVENTING STRUCTURE

(75) Inventors: Sun Choel Yang, Daejeon (KR); Ki Soo Chang, Daejeon (KR); Geon Hee Kim, Sejong (KP); Myeong Sang Kim, Daejeon (KR)

(73) Assignee: Korea Basic Science Institute, Daejeon (KR)

( * ) Notice: Subject to any disclaimer, the term of this patent is extended or adjusted under 35 U.S.C. 154(b) by 164 days.

(21) Appl. No.: 13/993,237

(22) PCT Filed: Nov. 14, 2011

(86) PCT No.: PCT/KR2011/008649
§ 371 (c)(1),
(2), (4) Date: Jun. 11, 2013

(87) PCT Pub. No.: WO2012/091284
PCT Pub. Date: Jul. 5, 2012

(65) Prior Publication Data
US 2013/0259584 A1  Oct. 3, 2013

(30) Foreign Application Priority Data

Dec. 28, 2010 (KR) .................. 10-2010-0136289

(51) Int. Cl.
B23B 27/00 (2006.01)
B23B 29/00 (2006.01)
B23Q 11/00 (2006.01)
B23B 27/10 (2006.01)

(52) U.S. Cl.
CPC ............ *B23B 27/002* (2013.01); *B23B 27/007* (2013.01); *B23B 2250/16* (2013.01); *B23Q 11/0032* (2013.01); *B23B 27/10* (2013.01); *B23B 2250/12* (2013.01); *Y10S 82/904* (2013.01)
USPC .................. 82/163; 408/143; 407/11; 82/904

(58) Field of Classification Search
CPC ................................ B23B 27/00; B23B 29/00
USPC .................... 82/163, 158, 904, 173; 408/143; 407/11; 409/141
See application file for complete search history.

(56) References Cited

U.S. PATENT DOCUMENTS

| | | | | |
|---|---|---|---|---|
| 2,028,930 | A | * | 1/1936 | Taylor .............................. 174/42 |
| 2,310,409 | A | * | 2/1943 | Ellman ........................... 433/117 |
| 2,426,359 | A | * | 8/1947 | Lankheet ....................... 408/143 |
| 2,606,366 | A | * | 8/1952 | Stevens .......................... 433/166 |

(Continued)

FOREIGN PATENT DOCUMENTS

| | | | | |
|---|---|---|---|---|
| EP | 1266710 | A1 * | 12/2002 | .............. B23B 29/02 |
| JP | 03221303 | A * | 9/1991 | .............. B23B 29/02 |

(Continued)

*Primary Examiner* — Sunil K Singh
*Assistant Examiner* — Sara Addisu
(74) *Attorney, Agent, or Firm* — KORUS Patent, LLC; Seong Il Jeong

(57) ABSTRACT

The present invention relates to a bit for processing the inside diameter of a work material, the bit having on the outer surface of a shank a vibration preventing structure comprising a vibration absorption body made of a silicone material, and a hollow wire rod, thereby absorbing the vibration generated from a machine tool, preventing resonance generated between the work material and a tool, and thus, enabling the implementation of a slickenside from ultra-precision machining.

6 Claims, 5 Drawing Sheets

(56) References Cited

U.S. PATENT DOCUMENTS

| | | | | |
|---|---|---|---|---|
| 2,842,014 A | * | 7/1958 | Miller | 408/144 |
| 3,058,705 A | * | 10/1962 | Hagg et al. | 248/624 |
| 3,207,009 A | * | 9/1965 | Carlstedt | 408/143 |
| 3,230,833 A | * | 1/1966 | Shurtliff | 409/141 |
| 3,263,770 A | * | 8/1966 | Alm | 181/230 |
| 3,292,237 A | * | 12/1966 | Fisher | 407/120 |
| 3,295,809 A | * | 1/1967 | Smola et al. | 248/292.13 |
| 3,463,048 A | * | 8/1969 | Owsen | 409/141 |
| 3,559,512 A | * | 2/1971 | Aggarwal | 408/143 |
| 3,663,116 A | * | 5/1972 | Muller et al. | 408/143 |
| 3,799,025 A | * | 3/1974 | Tsunoda | 83/835 |
| 3,848,931 A | * | 11/1974 | Swisher | 299/100 |
| 3,923,414 A | * | 12/1975 | Hopkins | 408/143 |
| 4,106,382 A | * | 8/1978 | Salje et al. | 83/835 |
| 4,168,754 A | * | 9/1979 | Nyholm | 175/325.2 |
| 4,187,754 A | * | 2/1980 | Beaty | 83/847 |
| 4,285,260 A | * | 8/1981 | Salje et al. | 83/835 |
| 4,616,738 A | * | 10/1986 | Shurtliff | 188/380 |
| 4,998,851 A | * | 3/1991 | Hunt | 408/143 |
| 5,560,348 A | * | 10/1996 | Markley et al. | 125/15 |
| 6,076,999 A | * | 6/2000 | Hedberg et al. | 407/66 |
| 6,345,942 B1 | * | 2/2002 | Cook | 409/131 |
| 6,634,651 B2 | * | 10/2003 | Tralli | 279/16 |
| 6,929,431 B2 | * | 8/2005 | Bergholt et al. | 408/143 |
| 7,234,379 B2 | * | 6/2007 | Claesson et al. | 82/1.11 |
| 7,418,783 B2 | * | 9/2008 | Fujimoto et al. | 29/896.9 |
| 8,240,961 B2 | * | 8/2012 | Mihic | 408/143 |
| 8,529,173 B2 | * | 9/2013 | Hoefler | 409/141 |
| 2005/0109182 A1 | * | 5/2005 | Murakami et al. | 83/651 |
| 2005/0232718 A1 | * | 10/2005 | Smith et al. | 409/141 |
| 2010/0172708 A1 | * | 7/2010 | Bolin et al. | 409/131 |
| 2010/0296889 A1 | * | 11/2010 | Lundblad et al. | 409/131 |

FOREIGN PATENT DOCUMENTS

| | | | | | |
|---|---|---|---|---|---|
| JP | 07164217 A | * | 6/1995 | | B23B 37/00 |
| JP | 11-277308 A | | 10/1999 | | |
| JP | 2001-280333 A | | 10/2001 | | |
| JP | 2003062758 A | * | 3/2003 | | B24D 5/00 |
| JP | 2003-136301 A | | 5/2003 | | |
| KR | 10-2005-0095928 A | | 10/2005 | | |
| KR | 10-2010-0121058 A | | 11/2010 | | |

\* cited by examiner

SURFACE ROUGHNESS OF A WINSTON CONE WHEN A TYPICAL LONG SHAFT BIT IS USED

SURFACE ROUGHNESS OF A WINSTON CONE WHEN A LONG SHAFT BIT WITH
VIBRATION SUPPRESSING STRUCTURE IS USED

LONG SHAFT BIT HAVING VIBRATION PREVENTING STRUCTURE

BACKGROUND OF THE INVENTION

The present invention disclosed herein relates to a long shaft bit with a vibration suppressing structure, and more particularly, to a long shaft bit for cutting process, which can obtain a processed surface with good surface roughness by preventing resonance and vibration during the cutting process and thus preventing a flaw from occurring on the processed surface of a cutting subject, using a vibration suppressing structure in which a vibration absorbing body is stacked on the shank in a multi-layer and a hollow wire rod is spirally coiled in each layer of the vibration absorbing body.

Generally, a bit with a long shank is being used to perform cutting operation on the inner diameter of a cutting subject such as a cylindrical body with a deep cutting depth, e.g., a parabolic aspherical reflector. A typical bit includes a tip fixing part, a connection part, and a shaft part, which are sequentially connected to one another to form a cylindrical body. Also, a tip is mounted on one side of the front end of the tip fixing part.

When viewed from the top, the tip has a substantially rhombic shape. One of cutting edges formed at two angular parts opposite to each other is slightly protruded from the front end and the outer circumferential surface of the front portion of the edge, and is detachably mounted on the front portion of the edge.

Also, a chip pocket is formed in the tip fixing part, and is opened to the front end and the outer circumferential surface of the bit. The chip pocket includes a flat face forming a substantially one surface with a tip face, and an inclination surface that inclines toward the upper outer circumferential surface of the tip fixing part as it goes from the rear end of the face to the rear side of the tip fixing part.

The bit with the above-mentioned configuration is used to perform cutting operation on the inner diameter of a cutting subject, that is, the inner diameter of a hole that is preformed in the cutting subject. First, while a shank is mounted on a tool grip part of a machine tool such as a tailstock of a lathe via a holder, the cutting subject is mounted on a workpiece grip part of the machine tool such that the shaft line of the inner diameter of the cutting subject faces the direction parallel to the shaft line of the shank.

The cutting process on the inner diameter of the cutting subject is performed by inserting the tip fixing part and the connection part into the hole of the cutting subject and cutting the hole of the cutting subject with the cutting edge of the tip to enlarge the diameter to a predetermined dimension while rotating the cutting subject around the shaft line of the inner diameter part and generating a relative motion around the shaft line direction between the tool grip part of the machine tool and the workpiece grip part.

In the typical bit in which the cutting process on the surface of the inner diameter of the cutting subject is performed by the above-mentioned structure, since the shank is formed in a longitudinal shaft, the vibration of the machine tool generated during the cutting process is delivered to the shank, and resonance may occur between the cutting subject and the tool, causing a flaw such as a processing pattern on the processed surface of the cutting subject.

Thus, in case of a product with a surface requiring a super-precision processing like mirror surface, it is difficult to finish the product by the cutting process. Although the cutting process may be performed, the productivity or the work efficiency is significantly reduced.

As a related art, Korean Utility Model No. 20-0317304 discloses a vibration knurling bit shank. The vibration knurling bit shank including a shank fixed to a tool post to process a workpiece and a cutting tip for processing the workpiece further comprises a seating part in which the cutting tip is coupled to an upper front end of the shank by a fixing bolt, a through hole formed to be spaced from a lower part of the seating part by a predetermined distance, a fastening part cut by a predetermined width in a diagonal direction to the front lower side of the through hole, a bolt receiving part formed in an orthogonal direction to the fastening part and allowing an adjustment bolt to be inserted and coupled, and a washer having a smaller size than the predetermined width of the fastening part.

Accordingly, in the related art, a separate knurlete is not needed to form a protrusion such as a knurling on a rolling roll. However, due to the vibration by the long shaft shank, the vibration knurling bit shank is not suitable for cutting process on the inner diameter of a hole of a cutting subject. Rather, the generated vibration causes a pattern on the surface of the inner diameter, or resonance occurs.

SUMMARY OF THE INVENTION

The present invention provides a long shaft bit with a vibration suppressing structure, which enables high-precision mirror-like finishing on a cutting subject by forming the vibration suppressing structure in which a vibration absorbing body made of silicone is formed on the outer surface of the long shaft bit in a multi-layer and a hollow wire rod is embedded in each layer of the vibration absorbing body to prevent the vibration and resonance during the cutting process for the cutting subject.

An embodiment of the present invention provides a long shaft bit with a vibration suppressing structure, including: a tip fixing part disposed at a front end of the long shaft bit and coupled to a cutting tip; a shank which is connected to the tip fixing part; and a bit fixing part which is connected to the shank to fix the bit, wherein the vibration suppressing structure is disposed on an outer surface of the shank to absorb vibration and prevent resonance during cutting process for a cutting subject, and the vibration suppressing structure includes a vibration absorbing body disposed on the outer surface of the shank in a multi-layer and a hollow wire rod spirally coiled in each layer of the multi-layer absorbing body.

In another embodiment, the vibration absorbing body may include: a first absorption layer disposed on the outer surface of the shank; a second absorption layer disposed on an outer surface of the first absorption layer; a third absorption layer disposed on an outer surface of the second absorption layer; and an outermost layer disposed on an outer surface of the third absorption layer.

In another embodiment, the hollow wire rod may be coiled inside the second absorption layer, the third absorption layer, and the outermost layer, respectively.

In still another embodiment, the first absorption layer, the second absorption layer, the third absorption layer, and the outermost layer may be made of silicone.

In even another embodiment, the hollow wire rod may be made of copper, enabling easier bending process.

In yet another embodiment, the long shaft bit may further include a cutting oil and compressed air supply pipe inside the first absorption layer to supply cutting oil and compressed air to the tip fixing part to which the cutting tip is coupled.

DETAILED DESCRIPTION

Some embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

Figure 1:
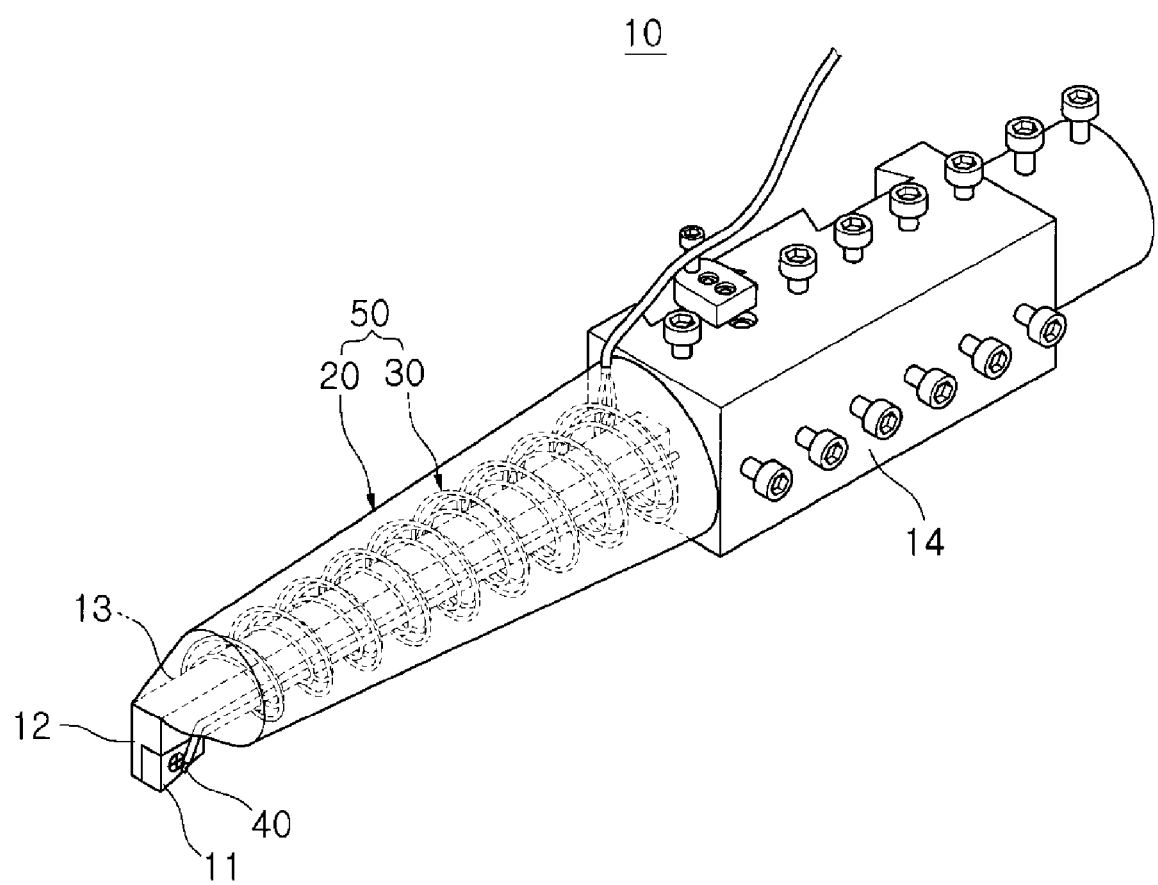
FIG. 1 is a perspective view illustrating a long shaft bit provided with a vibration absorbing body and a hollow wire rod.

As shown in FIG. 1, a long shaft bit 10 according to an embodiment of the present invention includes a tip fixing part 12 disposed at a front end of the long shaft bit and coupled to a cutting tip 11, a shank 13 which is connected to the tip fixing part 12, and a bit fixing part 14 which is connected to the shank to fix the bit 10. Here, a vibration suppressing structure 50 is disposed on an outer surface of the shank 13 to prevent vibration and resonance during cutting process for a cutting subject. The vibration suppressing structure 50 comprises a vibration absorbing body 20 disposed in a multilayer and a hollow wire rod 30.

The long shaft bit 10 may be used to perform cutting operation on the inner diameter of the cutting subject. The vibration generated during the cutting process of the inner diameter may be absorbed by the vibration absorbing body 20, and resonance may be prevented by the vibration absorbing body 20 and the hollow wire rod 30. Thus, the cutting subject with an excellent mirror-like surface can be obtained by a high-precision cutting process using the long shaft bit with the vibration suppressing structure.

During the cutting process of the inner diameter using the cutting tip 11, resonance may occur in the cutting subject due to the vibration of the machine tool and self-vibration of the machine tool and the cutting subject. In this case, the vibration may be absorbed by the vibration absorbing body 20 disposed on the outer surface of the shank 12 and be prevented from being delivered to the cutting tip 11. Accordingly, when cutting process on a product having a deep diameter is performed by the long shaft bit, a flaw such as a processing pattern can be prevented from occurring on the surface due to the vibration.

Figure 2:
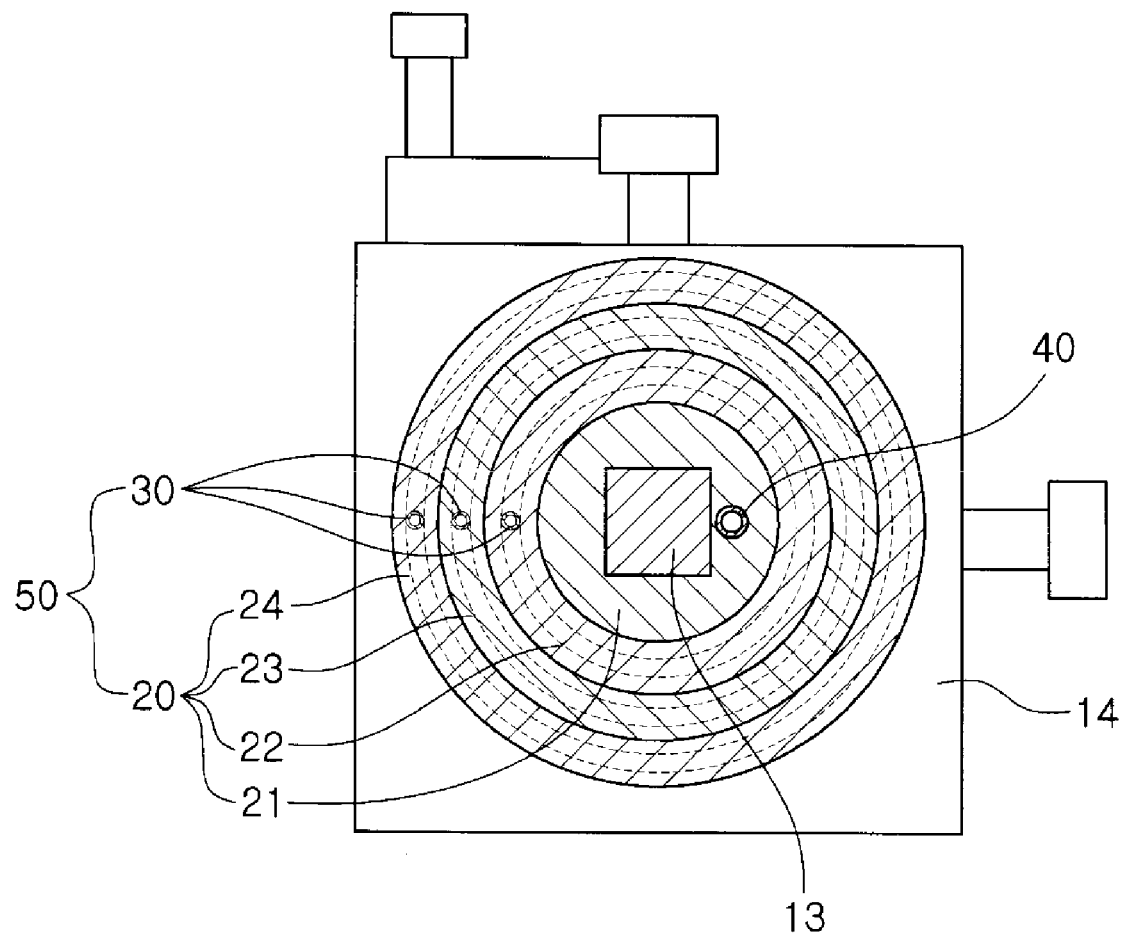
FIG. 2 is a cross-sectional view illustrating a long shaft bit including a vibration absorbing body and a hollow wire rod.

As shown in FIG. 2, the vibration absorbing body 20 may include a first absorption layer 21 disposed on the outer surface of the shank 13, a second absorption layer 22 disposed on the outer surface of the first absorption layer 21, a third absorption layer 23 disposed on the outer surface of the second absorption layer 22, and an outermost layer 24 disposed on the outer surface of the third absorption layer 23, which are stacked to form a multi-layer.

Also, the first absorption layer 21, the second absorption layer 22, the third absorption layer 23, and the outermost layer 24 may be made of silicone.

A method of disposing the vibration absorbing body 20 on the outer surface of the shank 13 is described as follows. First, the first absorption layer 21 may be formed by coating and drying silicone on the outer surface of the shank 13 in a thickness of about 5 mm to 10 mm such that its thickness is uniform and its shape is cylindrical. Next, the second absorption layer 22 may be formed by coating and drying silicone on the outer surface of the first absorption layer 21 in a thickness of about 5 mm to 10 mm such that its thickness is uniform and its shape is cylindrical. Next, the third absorption layer 23 may be formed by coating and drying silicone on the outer surface of the second absorption layer 22 in a thickness of about 5 mm to 10 mm such that its thickness is uniform and its shape is cylindrical. Finally, the outermost layer 24 may be formed by coating and drying silicone on the outer surface of the third absorption layer 23 in a thickness of about 5 mm to 10 mm such that its thickness is uniform and its shape is cylindrical.

Thus, the vibration absorbing body 20 including the first absorption layer 21, the second absorption layer 22, the third absorption layer 23, and the outermost layer 24 may absorb a vibration generated on the outer surface of the shank 13 during the cutting process.

As shown in FIG. 1, the hollow wire rod 30 may be spirally coiled inside the second absorption layer 22, the third absorption layer 23, and the outermost layer 24, respectively.

The hollow wire rod 30 may be embedded in the second absorption layer 22, the third absorption layer 23, and the outermost layer 24. The hollow wire rod 30 may be spirally coiled around the surface of the first absorption layer 21 that is formed by coating silicone on the outer surface of the shank 13, and then the second absorption layer 22 may be coated thereon.

Also, the third absorption layer 23 and the outermost layer 24 may also be formed after the hollow wire rod 30 is spirally coiled.

The hollow wire rod 30 may be made of copper, enabling easier bending process, and may have an outer diameter of about 1 mm to 1.5 mm and an inner diameter of about 0.5 mm or less. The pitch of the spiral of the hollow wire rod 30 may range from about 5 mm to about 20 mm.

Since the vibration suppressing structure in which the hollow wire rod 30 is added to the vibration absorbing body 20 absorbs the vibration generated by the machine tool, and particularly, absorbs the resonance generated between the cutting subject and the tool during the cutting process, the long shaft boring bit can be stably maintained. Accordingly, it is possible to manufacture a mirror-like surface by a high-precision cutting process for the inner diameter of the cutting subject and significantly improve the productivity and the work efficiency.

Figure 4:
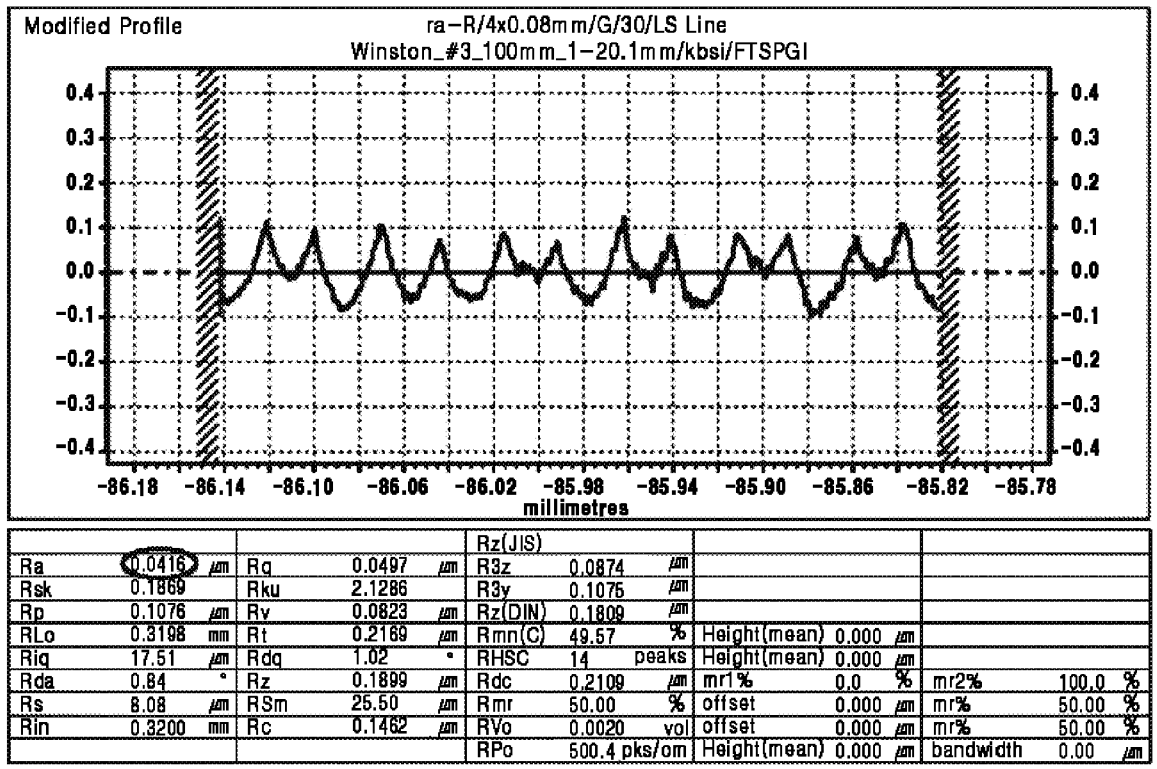
FIG. 4 is a graph illustrating a surface roughness measured after processing the inner surface of a parabolic aspherical reflector (Winston cone) equipped in a satellite imaging system using a long shaft bit without a vibration suppressing structure.
Figure 5:
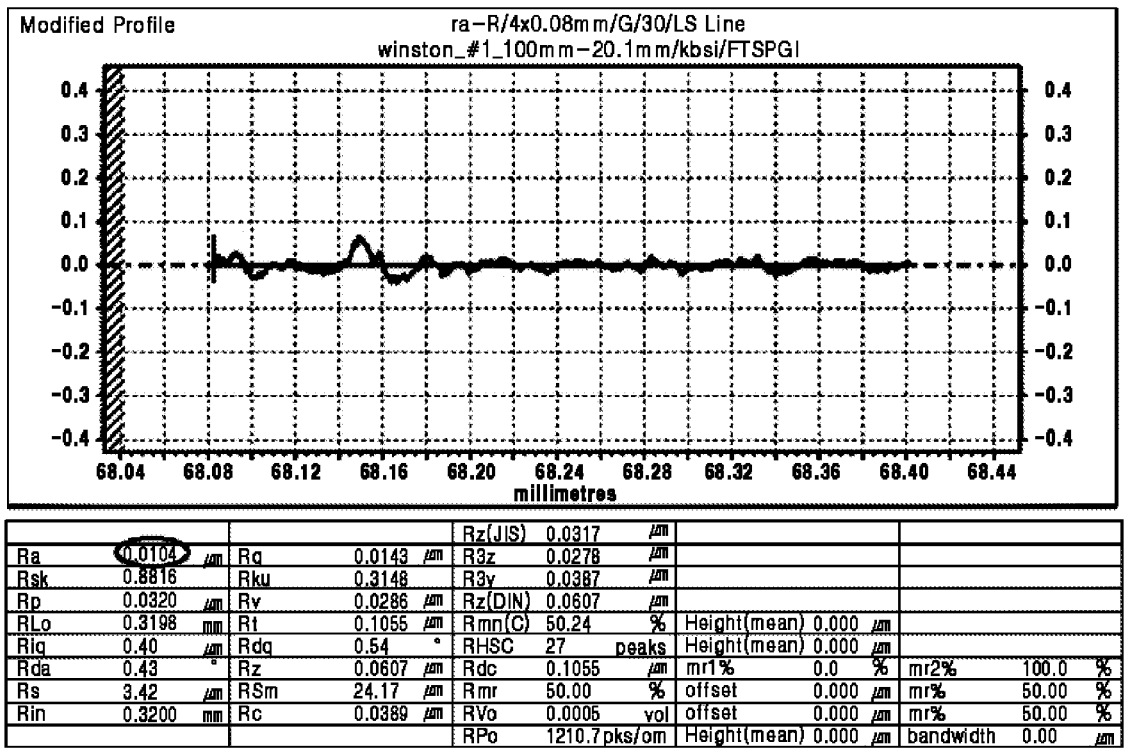
FIG. 5 is a graph illustrating a surface roughness measured after processing the inner surface of the reflector of FIG. 4 using a long shaft bit with a vibration suppressing structure of an embodiment of the present disclosure.

As shown in FIG. 4, when the cutting process on the inner surface of a cutting subject such as a parabolic aspherical reflector (Winston cone) used in a satellite imaging system is performed without a vibration suppressing structure 50, the average surface roughness RA is about 0.0418 micrometer. As shown in FIG. 5, when the cutting process is performed at the same condition using the long shaft bit including the vibration suppressing structure, the average surface roughness RA is about 0.0144 micrometer.

That is, when the long shaft bit with the vibration suppressing structure according to the embodiment is used for the cutting process, the average surface roughness can be reduced about four times compared to the long shaft bit without the vibration suppressing structure.

Figure 3:
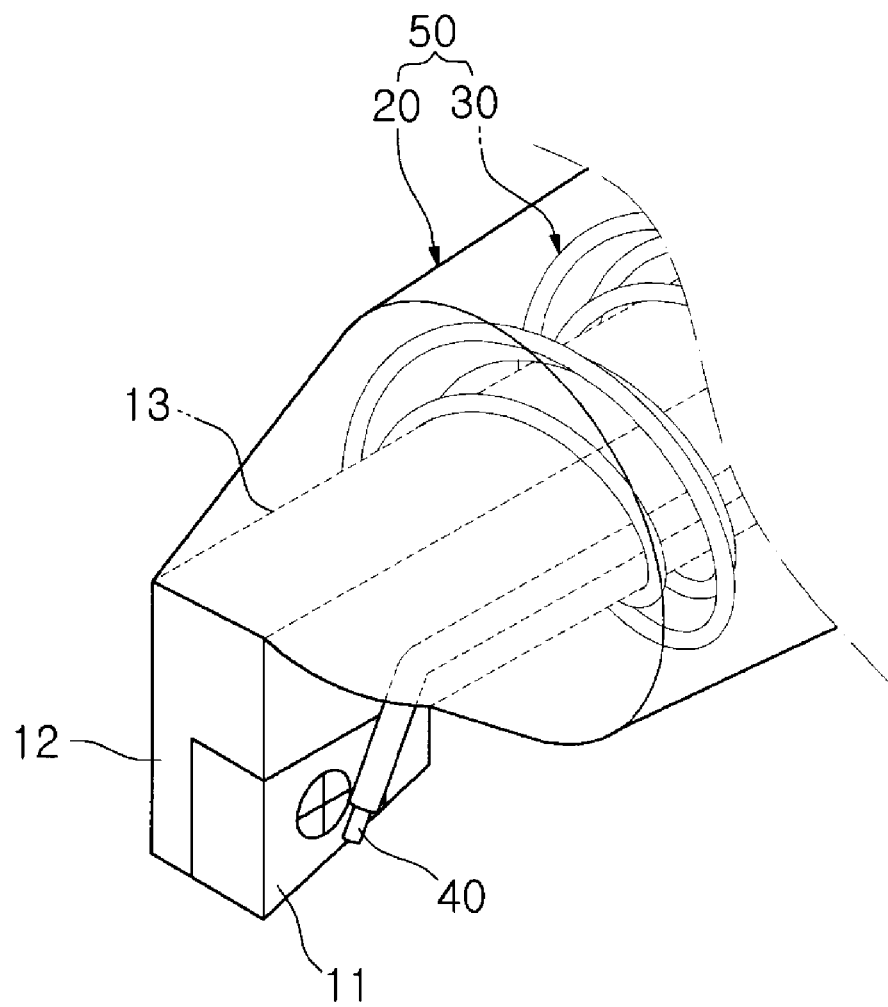
FIG. 3 is a perspective view illustrating a cutting oil and compressed air supply pipe disposed at the front end of a tool.

Also, as shown in FIG. 3, a cutting oil and compressed air supply pipe 40 may be disposed between the shank 13 and the first absorption layer 21, and may be inserted into the tip fixing part 12 to which the cutting tip 11 is coupled.

Accordingly, when the inner diameter of the cutting subject is cut by the cutting tip 11, the cutting oil and the compressed air that are necessary can be supplied to the cutting tip 11 through the cutting oil and compressed air supply pipe 40. In this case, since the cutting oil and compressed air supply pipe 40 is disposed inside instead of outside the bit, the bit can have a neat appearance.

In a long shaft bit with a vibration suppressing structure according to an embodiment of the present invention, since a multi-layered vibration absorbing body made of silicone is disposed on the outer surface of a shank and a hollow wire rod is spirally coiled in each layer of the vibration absorbing body, a vibration of a machine tool generated during the cutting process for the inner diameter part of a cutting subject can be absorbed, and resonance between the machine tool and the cutting subject can be prevented.

Thus, the long shaft bit can perform the cutting process while maintaining a stable state without a vibration, thereby preventing a flaw such as a cutting pattern generated by the vibration of a tool and thus enabling high-precision mirror-like finishing with an excellent surface roughness. Furthermore, the productivity and the work efficiency of the high-precision cutting process can be significantly improved.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and should not be restricted or limited by the foregoing embodiments.

What is claimed is:

1. A long shaft bit with a vibration suppressing structure, comprising:
    a tip fixing part disposed at a front end of the long shaft bit and coupled to a cutting tip;
    a shank which is connected to the tip fixing part; and
    a bit fixing part which is connected to the shank, the bit fixing part for fixing the bit,
    the vibration suppressing structure being disposed on an outer surface of the shank and comprising a vibration absorbing body disposed on the outer surface of the shank in a multi-layer and a hollow wire rod spirally coiled in a second absorption layer, a third absorption layer, and an outermost layer of the vibration absorbing body,
    whereby the vibration suppressing structure absorbs vibration and prevents resonance during cutting process for a cutting subject.

2. The long shaft bit of claim 1, wherein the vibration absorbing body comprises:
    a first absorption layer disposed on the outer surface of the shank;
    a second absorption layer disposed on an outer surface of the first absorption layer;
    a third absorption layer disposed on an outer surface of the second absorption layer; and
    an outermost layer disposed on an outer surface of the third absorption layer.

3. The long shaft bit of claim 2, wherein the hollow wire rod is spirally coiled inside the second absorption layer, the third absorption layer, and the outermost layer, respectively.

4. The long shaft bit of claim 2, wherein the first absorption layer, the second absorption layer, the third absorption layer, and the outermost layer are made of silicone.

5. The long shaft bit of claim 3, wherein the hollow wire rod is made of copper, enabling easier bending process.

6. The long shaft bit of claim 3, further comprising a cutting oil and compressed air supply pipe being inserted inside the first absorption layer, the cutting oil and compressed air supply pipe for supplying cutting oil and compressed air to the tip fixing part to which the cutting tip is coupled.

* * * * *